(12) United States Patent
Spencer et al.

(10) Patent No.: US 7,454,402 B2
(45) Date of Patent: Nov. 18, 2008

(54) METHOD FOR REPLICATION TRACING

(75) Inventors: William A. Spencer, Westford, MA (US); Russell L. Holden, Boxborough, MA (US); Michael J. Gagnon, Merrimack, NH (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 10/998,710

(22) Filed: Nov. 29, 2004

(65) Prior Publication Data

US 2006/0117076 A1 Jun. 1, 2006

(51) Int. Cl.
G06F 7/00 (2006.01)
(52) U.S. Cl. ............... 707/1; 707/10; 707/203; 707/204; 709/228; 709/231; 709/232; 713/400; 713/401
(58) Field of Classification Search ............... 707/200, 707/203, 1, 10, 204; 709/228, 231, 232; 713/400, 401
See application file for complete search history.

(56) References Cited

U.S. PATENT DOCUMENTS 6,061,686 A * 5/2000 Gauvin et al. ............... 707/10

2002/0169868 A1 * 11/2002 Lopke et al. ............... 709/224
2004/0064419 A1 4/2004 Glassco et al.

OTHER PUBLICATIONS

IBM Replication Monitoring Center for DB2, IBM, 2003.
GSX Monitor Replication Monitoring, Lotus Notes & Domino Tools and Services.

* cited by examiner

Primary Examiner—Hung Q Pham
(74) Attorney, Agent, or Firm—David A. Dagg

(57) ABSTRACT

In a network in which local copies of a shared document are maintained by multiple servers, performance data is gathered and stored during document synchronization via replication. The performance data includes a delay indicator which is associated with the document such that each copy of the document includes a record of which servers and hops were traversed and what delay was experienced at each of those servers and hops. The delays may be calculated by associating a time stamp with the document upon receipt at a server, and subsequently comparing time of receipt at a logically adjacent server with the time stamp. The performance data can be used to locate problems.

7 Claims, 3 Drawing Sheets

200

202

206

204

A->B: ServerIdentity: A
HopDelay: 10

B->C: ServerIdentity: A
HopDelay: 10
ServerIdentity: B
HopDelay: 10

B->D: ServerIdentity: A
HopDelay: 10
ServerIdentity: B
HopDelay: 10

C->E: ServerIdentity: A
HopDelay: 10
ServerIdentity: B
HopDelay: 10
ServerIdentity: C
HopDelay: 25

METHOD FOR REPLICATION TRACING

FIELD OF THE INVENTION

This invention is generally related to document replication, and more particularly to gathering information indicative of network function during document replication.

BACKGROUND OF THE INVENTION

Shared electronic documents, folders and threads (collectively, "documents") facilitate the exchange of ideas and information via a network. In order to facilitate access, the shared documents may be distributed across multiple servers in the network. In particular, network collaboration tools facilitate access to the documents by maintaining a local copy of each document on multiple servers that are in communication via a network, i.e., each copy is local to a given server. When a user prompts a computer to access the document, the computer obtains a copy of the document from a logically nearby server. The multiple local copies of the document are synchronized in order to maintain document integrity, i.e., to avoid spawning different versions of the document. In particular, the local copies of the document are synchronized once one of the local copies has been modified. Synchronization may be accomplished by transferring an indication of the changes made to the document to each server that maintains a local copy of the document. The existing local copy of the document is then updated with the changes to the modified document.

Proper synchronization of the local copies of the document is reliant upon proper network operation. For example, if any of the servers that maintain a local copy of the document functions poorly or fails, or if a network node such as a switch or router connected between servers functions poorly or fails, synchronization may be delayed or fail. It would be desirable to be able to locate the cause of such a delay or failure.

SUMMARY OF THE INVENTION

In accordance with the present invention a document sharing node for maintaining a copy of a shared document that is also maintained by at least a second node includes: a receiver operative to receive updates of the shared document from the second node, a processor operative to provide a time indication, a processor operative to compare the time indication with a time stamp associated with the shared document thereby producing a delay indicator, and a processor operative to associate the delay indicator with the updated copy of the shared document. The nodes may be servers, switches, routers, bridges, hubs or any other networkable device. The time indication and time stamp may be an indication of real time, or simply a loosely coupled indicator of relative time lapse.

One advantage of the invention is that each node is provided with a version of the document which indicates the path traversed to the node and an indication of the delay experienced at each hop. For example, a hidden field in each document may contain hop delay information which is unique to the path from the originating node to that node. The unhidden content of the document may be identical at each node such that the technique is transparent to users of the shared document system. However, by examining a document at one or more nodes an administrator or software routine may localize the source of a problem. For example, examination of the document at particular node might indicate that a significantly higher replication delay was experienced at a particular hop. Remedial actions could then be taken.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
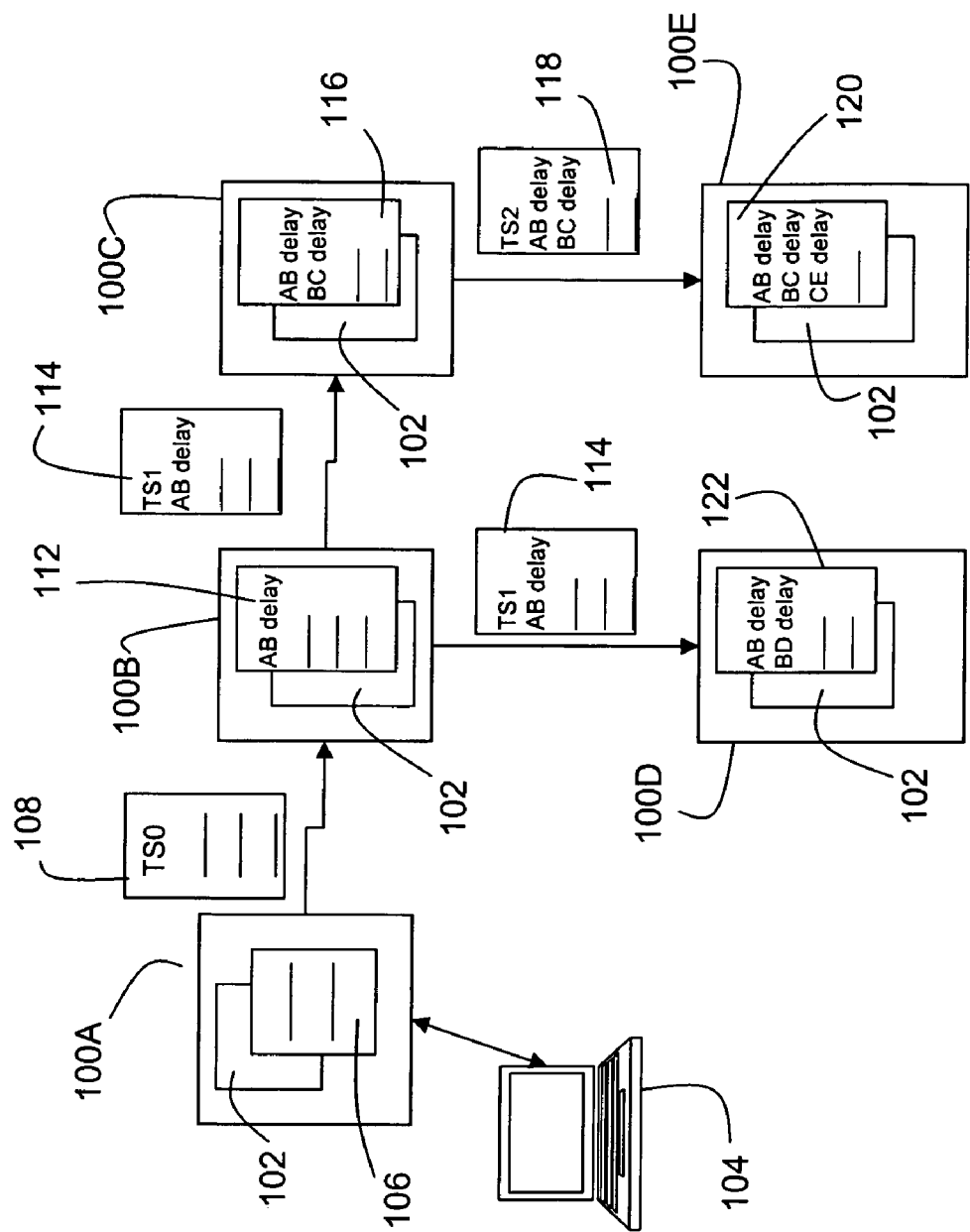
FIG. 1 is a block diagram of a network in which document replication tracing is implemented.

Referring to FIG. 1, a document sharing network includes a plurality of nodes 100A-100E which are in communication via a network. The nodes 100A-100E may be servers, switches, routers, bridges, hubs or any other networkable device. The nodes may be in communication via other network devices such as switches, routers, bridges and hubs (not illustrated), which are not specifically the focus of the invention.

Each node 100A-100E is operative to maintain local copies of shared documents, such as shared document 102. Further, each node may be associated with a plurality of local computers which are unique to that node. The local computers, such as local computer 104, are permitted to access the local copy of the document 102. If appropriate permissions are present, the local copy of the document 102 may be modified by the local computer 104 associated with the node 100A. Once the local copy of the document has been modified, it differs from other local copies of the document maintained by other nodes. Document 106 represents the modifications to document 102. Since it is desirable that the local copies are consistent, the node may prompt synchronization via replication. In particular, the node transmits a copy of the modifications to each of the other nodes 100A-100E.

Figure 2:
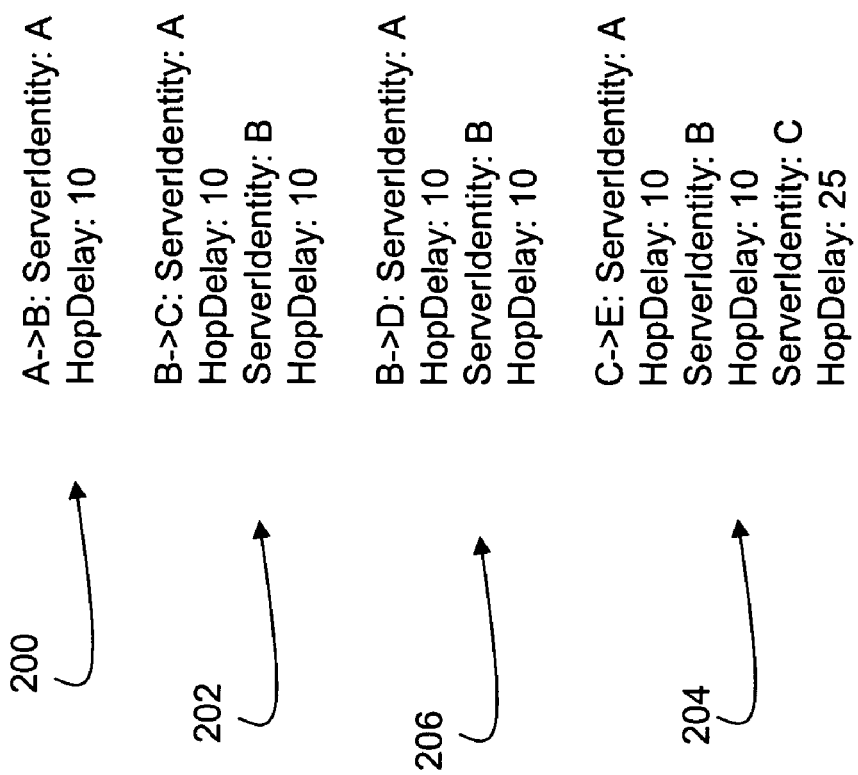
FIG. 2 illustrates the delay information of FIG. 1 in greater detail.
Figure 3:
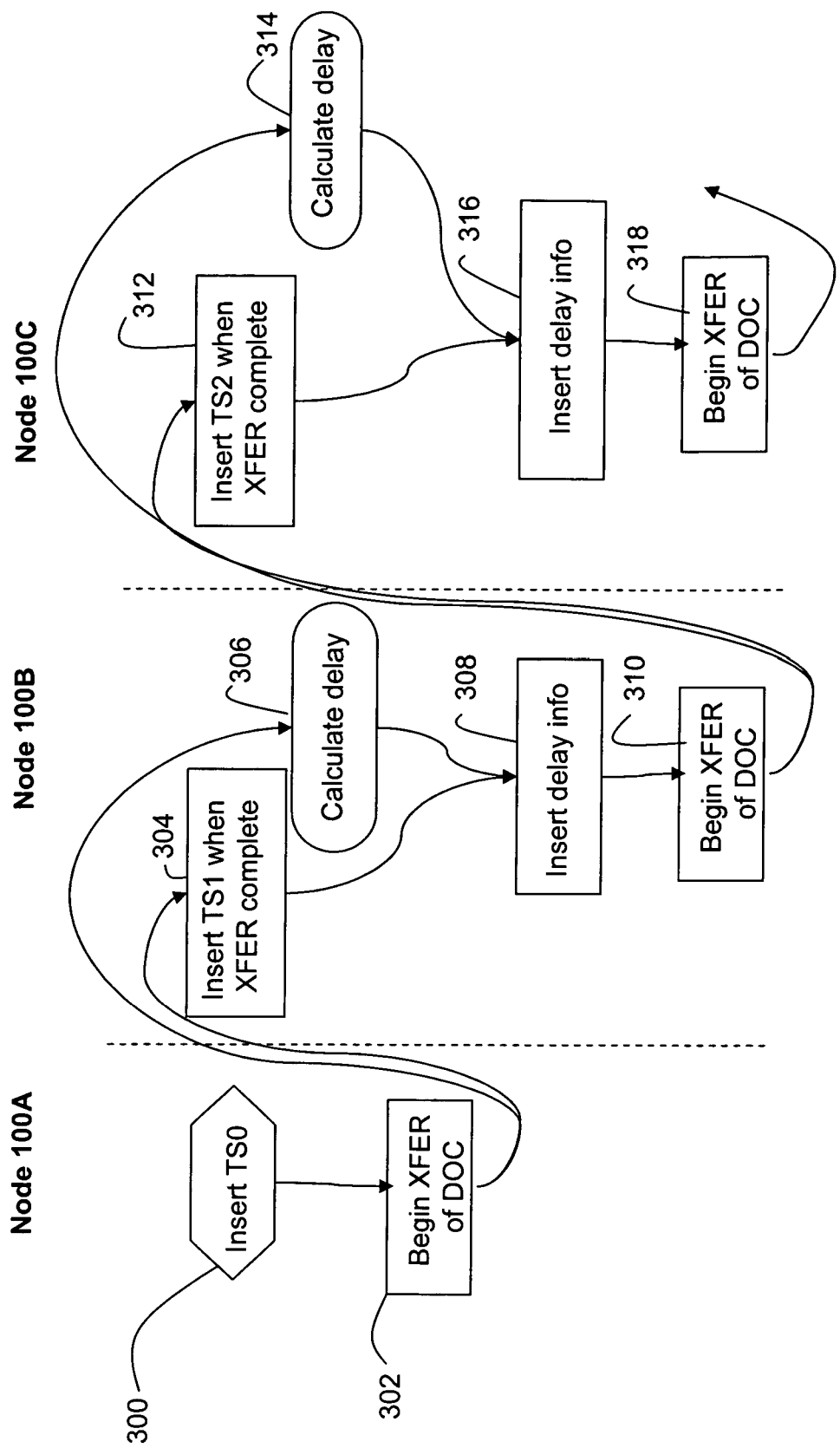
FIG. 3 is a flow diagram illustrating a method of document replication tracing.

Referring now to FIGS. 1-3, replication includes a tracing routine which produces information indicative of delays in each server and hop transited during replication. In particular, the delay information includes both transmission time and time spent on a node awaiting transmission. Time spent awaiting transmission includes time waiting for the next hop node to become available and delay caused by the current node being busy.

When the modifications document 106 is created, node 100A associates a time stamp TS0 with the modifications document 106 to produce modifications document 108, as shown in step 300. The time stamp may be a real-time clock value, and may be inserted into a hidden field in document 106. Node 100A then transmits the modifications document 108 to node 100B, as shown in step 302.

When the transfer of document 108 from node 100A to node 100B is complete, node 100B associates new time stamp TS1 with the document as shown in step 304. Contemporaneously with step 304, node 100B compares the time stamp TS0 value with the value of the node 100B real time clock, as shown in step 306. The difference between the two values is the delay for the hop "A→B," which indicates time spent awaiting transmission on node 100A in addition to the time of transmission between node 100A and node 100B. A hop delay indicator 200 is then inserted into a hidden field in the modifications document as shown in step 308, producing modifications document 112. The indicator 200 may include an identification of the hop, e.g., A→B, an indication of the originating node, e.g., ServerIdentity: A, and an indication of the hop delay, e.g., HopDelay: 10. The hop delay may be expressed in any suitable units, including but not limited to minutes and seconds. The old version of document 102 on node 100B is then updated with document 112.

Once the hop delay indicator 200 and time stamp TS1 have been inserted into the document, thereby creating modifications document 114, node 100B transmits document 114 to the next logical nodes in the network tree structure as shown in step 310. In the illustrated embodiment, the modifications document 114 is transmitted from node 100B to both node 100D and node 100C.

The receiving nodes 100D and 100C operate upon the modifications document 114 in a manner similar to node 100B. For example, when the transfer from node 100B to node 100C is complete, node 100C associates time stamp TS2 with the document as shown in step 312. Contemporaneously with step 312, node 100C compares the time stamp TS1 value with the value of the node 100C real time clock, as shown in step 314. The difference between the two values is the hop delay for the hop "B→C," which indicates time spent awaiting transmission on node 100B in addition to the time of transmission between node 100B and node 100C. A hop delay indicator 202 is then inserted into a hidden field as shown in step 316, producing modifications document 116 which updates document 102 on node 100C. The indicator 202 may include an identification of the hop, e.g., B->C, an indication of the originating node, e.g., ServerIdentity: A, an indication of the A->B hop delay, e.g., HopDelay: 10, and an indication of the B->C hop delay, e.g., ServerIdentity:B and HopDelay: 10. The hop delays may be expressed in any suitable units, including but not limited to minutes and seconds.

Once the hop delay indicator 202 and timestamp TS2 have been inserted into the document, thereby producing modifications document 118, node 100C transmits the modifications document 118 to the next logical node in the network tree structure as shown in step 318. In the illustrated embodiment, the modifications document is transmitted from node 100C to node 100E. Following receipt of the modifications document 118 node 100E operates upon the document in a manner similar to node 100C. For example, a hop delay 204 is calculated and associated with the document to produce document 120, which updates document 102 on node 100E. Similarly, node 100D associates a hop delay indicator 206 with document 114 from node 100B to produce document 122 which updates document 102 on node 100D. However, the final node in a given branch of the network, such as nodes 100D and 100A, will not insert a new time stamp and transmit the modified document further.

In view of the description above it will be appreciated that the described replication procedure provides each node with a slightly different version of the modified document. In particular, the hidden field of each document contains hop delay information which is unique to the path from the originating node to that node. The unhidden content of the document is identical at each node. Hence, by examining a document at one or more nodes an administrator or software routine may localize the source of a problem. For example, examination of the document at node 100E would indicate that a significantly higher replication delay was experienced at hop C->E than at both hops A->B and B->C. Although the invention has been described with regard to a single replication operation, in practice multiple replication operations could be processed. Replication operations could be initiated by any of the nodes, and further could be initiated in close temporal proximity.

In view of the description above, it will be understood by those of ordinary skill in the art that modifications and variations of the described and illustrated embodiments may be made within the scope of the inventive concepts. Moreover, while the invention is described in connection with various illustrative structures, those of ordinary skill in the art will recognize that the invention may be employed with other structures. Accordingly, the invention should not be viewed as limited except by the scope and spirit of the appended claims.

What is claimed is:

1. A method for tracing modification documents conveyed among a plurality of servers in order to replicate changes made by users to a shared document, wherein the method facilitates localization of a source of a problem by an administrator, wherein the shared document is shared across the plurality of servers, comprising:

creating, at a first one of the servers, a modification document representing only changes made to the shared document by a user of a local computer uniquely associated with the first one of the servers;

storing, by the first one of the servers, following completion of the changes, a first time stamp in a field of the modification document;

transmitting the modification document, including the first time stamp in the field of the modification document, from the first one of the servers to a second one of the servers;

receiving the modification document at the second one of the servers;

calculating, by the second one of the servers, a second server receipt time equal to a time at which receipt of the modification document at the second one of the servers is completed;

calculating, by the second one of the servers, a first hop delay value equal to a difference between the first time stamp and the second server receipt time;

storing, by the second one of the servers, an identity of the first one of the servers together with the first hop delay value into the modification document;

overwriting, by the second one of the servers, the first time stamp in the field of the modification document with a second time stamp equal to the second server receipt time; and transmitting, by the second one of the servers, the modification document, including the identity of the first one of the servers, the first hop delay value, and the second time stamp, to a third one of the plurality of servers.

2. The method of claim 1 further comprising:

receiving the modification document at the third one of the servers;

calculating, by the third one of the servers, a third server receipt time equal to a time at which receipt of the modification document at the third one of the servers is completed;

calculating, by the third one of the servers, a second hop delay value equal to a difference between the second time stamp and the third server receipt time;

storing, by the third one of the servers, an identity of the second one of the servers together with the second hop delay value into the modification document; and overwriting, by the third one of the servers, the second time stamp in the field of the modification document with a third time stamp equal to the third server receipt time.

3. The method of claim 2, further comprising:
transmitting, by the third one of the servers, the modification document, including the identity of the second one of the servers, the second hop delay value, and the third time stamp, to a fourth one of the plurality of servers;
receiving the modification document at the fourth one of the servers;
calculating, by the fourth one of the servers, a fourth server receipt time equal to a time at which receipt of the modification document at the fourth one of the servers is completed;
calculating, by the fourth one of the servers, a third hop delay value equal to a difference between the third time stamp and the fourth server receipt time;
storing, by the fourth one of the servers, an identity of the third one of the servers together with the third hop delay value into the modification document; and
overwriting, by the fourth one of the servers, the third time stamp in the field of the modification document with a fourth time stamp equal to the fourth server receipt time.

4. The method of claim 1, further comprising:
wherein the first hop delay value includes both transmission time of the modification document and time spent by the modification document on the first one of the servers awaiting transmission from the first one of the servers to the second one of the servers.

5. The method of claim 4, wherein the time spent awaiting transmission from the first one of the servers to the second one of the servers includes time waiting for the second one of the servers to become available.

6. The method of claim 5, wherein the time spent awaiting transmission from the first one of the servers to the second one of the servers further includes delay caused by the first one of the servers being busy.

7. A system for tracing modification documents conveyed among a plurality of servers in order to replicate changes made by users to a shared document, wherein the method facilitates localization of a source of a problem by an administrator, wherein the shared document is shared across the plurality of servers, comprising:
a first one of the servers for
creating a modification document representing only changes made to the shared document by a user of a local computer uniquely associated with the first one of the servers,
storing, following completion of the changes, a first time stamp in a field of the modification document, and
transmitting the modification document, including the first time stamp in the field of the modification document, to a second one of the servers; and
a second one of the servers for receiving the modification document from the first server,
calculating a second server receipt time equal to a time at which receipt of the modification document at the second one of the servers is completed,
calculating a first hop delay value equal to a difference between the first time stamp and the second server receipt time,
storing an identity of the first one of the servers together with the first hop delay value into the modification document,
overwriting the first time stamp in the field of the modification document with a second time stamp equal to the second server receipt time, and
transmitting the modification document, including the identity of the first one of the servers, the first hop delay value, and the second time stamp, to a third one of the plurality of servers.

* * * * *